(12) United States Patent
Fang et al.

(10) Patent No.: US 8,165,234 B2
(45) Date of Patent: Apr. 24, 2012

(54) METHOD AND SYSTEM FOR SYNCHRONIZING OFDM TRANSMISSION SYMBOLS

(75) Inventors: Liming Fang, Shenzhen (CN); Jun Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 697 days.

(21) Appl. No.: 12/273,964

(22) Filed: Nov. 19, 2008

(65) Prior Publication Data

US 2009/0141822 A1 Jun. 4, 2009

Related U.S. Application Data

(63) Continuation of application No. PCT/CN2007/070192, filed on Jun. 27, 2007.

(30) Foreign Application Priority Data

Jun. 30, 2006 (CN) .......................... 2006 1 0061476

(51) Int. Cl.
*H04L 27/28* (2006.01)
(52) U.S. Cl. ...................................... 375/260
(58) Field of Classification Search ................ 375/259, 375/260, 354
See application file for complete search history.

(56) References Cited

U.S. PATENT DOCUMENTS

| | | | | |
|---|---|---|---|---|
| 4,725,839 | A | * | 2/1988 | Crowe ..................... 340/870.31 |
| 5,864,592 | A | * | 1/1999 | Itri ................................ 375/375 |
| 6,133,770 | A | * | 10/2000 | Hasegawa ..................... 327/156 |
| 6,208,701 | B1 | * | 3/2001 | Hiramatsu et al. ............ 375/354 |
| 6,327,666 | B1 | | 12/2001 | Langberg et al. |
| 6,937,613 | B1 | | 8/2005 | Bedrosian |
| 6,950,475 | B1 | | 9/2005 | Lewis |
| 6,976,202 | B1 | * | 12/2005 | Rezvani et al. ............... 714/752 |
| 6,985,548 | B1 | * | 1/2006 | Jabbar et al. ................. 375/355 |
| 2002/0126706 | A1 | | 9/2002 | Laroia et al. |
| 2004/0100939 | A1 | | 5/2004 | Kriedte et al. |
| 2008/0212574 | A1 | * | 9/2008 | Andre et al. ................. 370/356 |

FOREIGN PATENT DOCUMENTS

| | | |
|---|---|---|
| CN | 1182341 A | 5/1998 |
| CN | 1226108 A | 8/1999 |
| CN | 1466293 A | 1/2004 |
| EP | 0812079 A2 | 12/1997 |

(Continued)

OTHER PUBLICATIONS $2^{nd}$ Office Action in corresponding European Application No. 07721803.0 (Nov. 12, 2010).

(Continued)

*Primary Examiner* — Kevin M Burd
(74) *Attorney, Agent, or Firm* — Leydig, Voit & Mayer, Ltd.

(57) ABSTRACT

A method for synchronizing orthogonal frequency division multiplexing (OFDM) transmission symbols includes: an OFDM transmission module receives a synchronization signal, and adjusts the OFDM symbols sent by all lines to synchronous symbols according to the synchronization signal and send the symbols out. The present invention also provides a system for synchronizing OFDM transmission symbols. In the present invention, the weaknesses of the prior art are overcome; a synchronization signal generator generates a synchronization signal and sends it to the OFDM transmission equipment; and the OFDM transmission equipment adjusts the OFDM symbols sent by all lines to synchronous symbols according to the synchronization signal and send the symbols out, thus accomplishing synchronization between OFDM symbols and optimizing the performance of the dynamic spectrum management (DSM).

17 Claims, 9 Drawing Sheets

FOREIGN PATENT DOCUMENTS

| | | |
|---|---|---|
| EP | 1 424 821 A2 | 6/2004 |
| WO | WO 2006121378 A1 * | 11/2006 |

OTHER PUBLICATIONS

Written Opinion of the International Searching Authority in corresponding PCT Application No. PCT/CN2007/070192 (Oct. 11, 2007).

Song, "The OFDM Technology in the Next Generation Mobile Communication System," *Mobile Communication*, 11: 20-23 (Nov. 2001).

3$^{rd}$ Office Action in corresponding European Application No. 07721803.0 (Dec. 6, 2011).

* cited by examiner

Sync signal generator

METHOD AND SYSTEM FOR SYNCHRONIZING OFDM TRANSMISSION SYMBOLS

CROSS-REFERENCE TO RELATED APPLICATIONS

This application is a continuation of International Patent Application No. PCT/CN2007/070192, filed Jun. 27, 2007, which claims priority to Chinese Patent Application No. 200610061476.1, filed Jun. 30, 2006, both of which are hereby incorporated by reference in their entirety.

FIELD OF THE INVENTION

The present invention relates to the field of the Digital Subscriber Line (DSL) field, and in particular, to an Orthogonal Frequency Division Multiplexing (OFDM) technology, more particularly, to a method and system for synchronizing OFDM transmission symbols.

BACKGROUND

The DSL technology is a high-speed data transmission technology implemented through Unshielded Twisted Pair (UTP), including Asymmetrical Digital Subscriber Line (ADSL), Very-high-bit-rate Digital Subscriber Line (VDSL), Integrated Services Digital Network (ISDN)-based Digital Subscriber Line (IDSL), and Single-pair High-bit-rate Digital Subscriber Line (SHDSL).

Among various DSL technologies (xDSL), except the xDSL based on baseband transmission (for example, IDSL and SHDSL), the xDSL technologies based on passband transmission coexist with the Plain Old Telephone Service (POTS) on a twisted pair by means of the frequency division multiplexing technology, in which the xDSL occupies the high band and the POTS occupies the baseband part below 4 KHz; and the POTS signals are separated from the xDSL signals through a splitter, or combined with the xDSL signals through a combiner.

The xDSL based on passband transmission uses the Discrete Multi-Tone (DMT) modulation technology for modulation and demodulation. The system that provides multiple channels of DSL access is called "DSL Access Multiplexer (DSLAM)." The connection relations of a DSLAM system are shown in FIG. 1: The DSLAM 120 includes a customer premises transceiver unit 121 and a splitter/combiner 122. In the uplink direction, the customer premises transceiver unit 121 receives DSL signals from the computer 110, amplifies the received signals, and sends the amplified DSL signals to the splitter/combiner 122; the splitter/combiner 122 combines the DSL signals from the customer premises transceiver unit 121 and the POTS signals from the telephone terminal 130; the combined signals are transmitted through multiple Unshielded Twisted Pairs (UTPs) 140, and the splitter/combiner 151 of the peer DSLAM 150 receives the signals; the splitter/combiner 151 splits the received signals, sends the POTS signals to the Public Switched Telephone Network (PSTN) 160, and sends the DSL signals to the central office transceiver unit 152 of the DSLAM 150; and the central office transceiver unit 152 amplifies the received signals, and sends them to the Network Management System (NMS) 170. In the downlink direction, the signals are transmitted reversely.

As the band applied to the xDSL technology is higher and higher, crosstalk becomes a nuisance, especially in a high band. FIG. 2A and FIG. 2B show the Near End Cross Talk (NEXT) and the Far End Cross Talk (FEXT) in the xDSL. As shown in FIG. 2A, port 1 and port 2 in the DSLAM 210 are connected with the Remote Terminal Unit (RTU) 211 through cables. The uplink and downlink channels of the xDSL are based on the frequency division multiplexing technology, so the NEXT causes little harm to the system performance. As shown in FIG. 2B, port 1 and port 2 of DSLAM 220 are connected with the RTU 221 respectively through cables. The uplink and downlink channels of the xDSL are based on the frequency division multiplexing technology, so the FEXT deteriorates the line transmission performance drastically. For example, when xDSL services are activated for multiple users in a bundle of cables, some lines may suffer from low transmission rate and instability or even xDSL services fail to be activated because of FEXT, leading to a low activation rate of the DSLAM.

In order to achieve higher rates or greater service radiuses, the prior art uses the binding technology. The binding technology is characterized by using multiple pairs of subscriber lines concurrently as physical transmission media. At the lower band (with lower FEXT), the comprehensive performance of the binding technology is roughly the linear sum of the performance of all subscriber lines. At the higher band (with higher FEXT), the comprehensive performance of the binding technology is far less than the linear sum of the performance of all subscriber lines as affected by FEXT. Technically, the binding process simply treats the crosstalk as noise, and cannot make the most of the information transferred in the crosstalk.

In order to solve the FEXT problem in the previous binding solution, a Dynamic Spectrum Management (DSM) technology emerges recently. The DSM technology solves the FEXT problem through Multi-Input and Multi-Output (MIMO) and vectored DSL technologies on the signal plane.

With respect to the modulation mode, the MIMO technology is OFDM. As shown in FIG. 3, the conception of the OFDM is to divide a band into multiple tones of narrower frequencies, with each tone bearing a certain quantity of bits. The frequency of each tone is narrow. Therefore, the transmission function of a channel in this band is approximately regarded as a constant which verges on distortion-free transmission and facilitates processing at the receiver side. Moreover, each tone is completely orthogonal, and the tones do not affect each other.

Both the optimization of the DSM technology and the crosstalk cancellation of the MIMO technology are based on the orthogonal feature mentioned above. Generally, the receiver of each previous xDSL modem treats the interference from other modems onto this modem as noise. Therefore, the data rate accomplishable on number k tone of number n user ($b_k^n$) can be calculated through a Shannon channel capacity formula:

$$b_k^n = \log_2\left(1 + \frac{|h_k^{n,n}|^2 s_k^n}{\sum_{m \neq n} |h_k^{n,m}|^2 s_k^m + \sigma_k^n}\right)$$

In the above formula, $h_k^{n,n}$ is the transmission function of number n line on number k tone; $h_k^{n,m}$, is the crosstalk function of number m line on number k tone against number n line; $\sigma_k^n$ is the noise power of number n line on number k tone; and $s_k^n$ is the transmitted power of number n line on number k tone.

The above formula shows that the whole DSM rate calculation is based on each tone due to the orthogonal feature of tones. If the orthogonal feature of each tone is damaged, all DSM algorithms will change, and the algorithms enumerated above will not be applicable.

When the symbol (frame) is not synchronous between all lines, the orthogonal feature of the tone will be damaged. As shown in FIG. 4, line 1 is affected by the interference from line 2, and the symbols are not synchronous between line 1 and line 2. When line 1 performs OFDM demodulation, line 1 will handle some signals of symbol 1 and symbol 2 in line 2, which is equivalent to adding window 2 and window 3 on line 2 respectively. Evidently, window 2 and window 3 are shorter than the normal OFDM signals (as shown in window 1). Consequently, the spectrum width differs between window 2 and window 3, which damages the orthogonal feature of frequency. That is, the signals of different frequencies generate interference to each other.

SUMMARY

The present invention provides a method and system for synchronizing OFDM transmission symbols in order to synchronize the OFDM symbols and prevent damage to the orthogonal feature of the OFDM tones.

A method for synchronizing OFDM transmission symbols in an embodiment of the present invention includes: receiving, by an OFDM transmission module, synchronization signals; and adjusting the OFDM symbols sent by all lines to synchronous symbols according to the synchronization signals, and sending the symbols out.

In another embodiment of the present invention, a system for synchronizing OFDM transmission symbols includes: a synchronization signal generator, adapted to generate a synchronization signal and send it out; and an OFDM transmission module, adapted to receive the synchronization signal sent by the synchronization signal generator, and adjust the OFDM symbols sent by all lines to synchronous symbols according to the synchronization signal and send the symbols out.

In the present invention, a synchronization signal generator generates a synchronization signal and sends it to the OFDM transmission module; the OFDM transmission module adjusts the OFDM symbols sent by all lines to synchronous symbols according to the synchronization signal and send the symbols out, thus implementing synchronization between OFDM symbols and optimizing the performance of the DSM.

BRIEF DESCRIPTION OF THE DRAWINGS

In order to describe the technical solutions under the present invention and the prior art more clearly, the drawings for illustrating the embodiments of the present invention or the prior art are introduced briefly below. Evidently, the accompanying drawings are for exemplary purpose only, and those skilled in the art can derive other drawings from such accompanying drawings without making any creative effort.

DETAILED DESCRIPTION

The technical solution under the present invention is elaborated below with reference to the accompanying drawings. Evidently, the embodiments described below are for exemplary purpose only, without covering all embodiments of the present invention. Those skilled in the art can make no creative effort to derive all other embodiments from the embodiments described below, without departing from the protection scope of the present invention.

In the present invention, a synchronization signal generator generates a synchronization signal and sends it to the OFDM transmission module; the OFDM transmission module adjusts the OFDM symbols sent by all lines to synchronous symbols according to the synchronization signal and send the symbols out, thus preventing damage to the orthogonal feature of the OFDM tones caused by asynchronous OFDM symbols.

The present invention is hereinafter described in detail with reference to embodiments and accompanying drawings.

Figure 1:
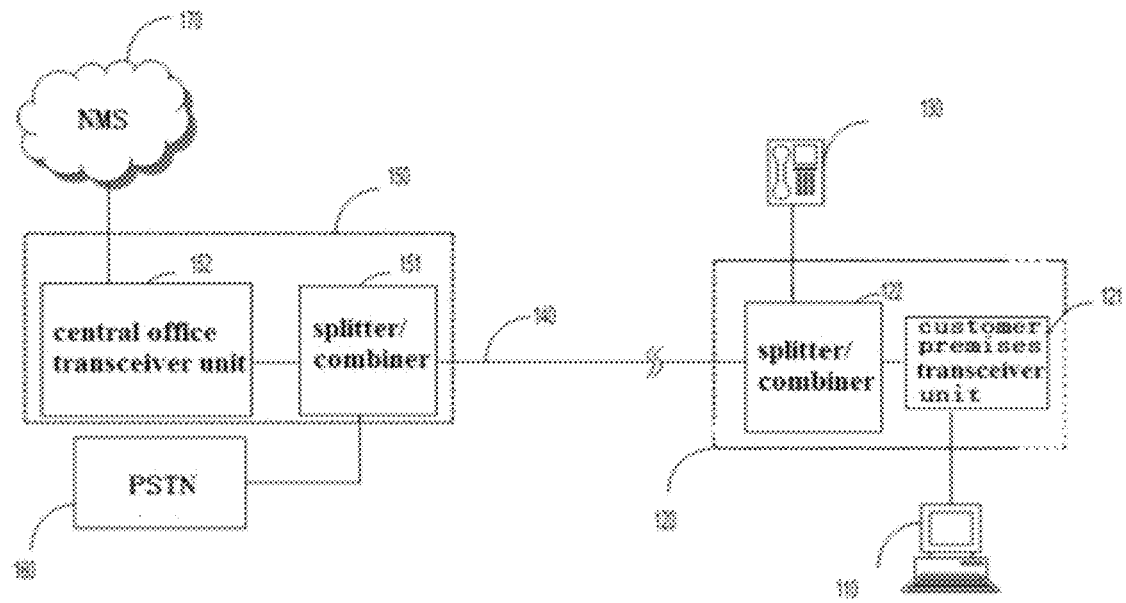
FIG. 1 shows a xDSL system model.
Figure 2A:
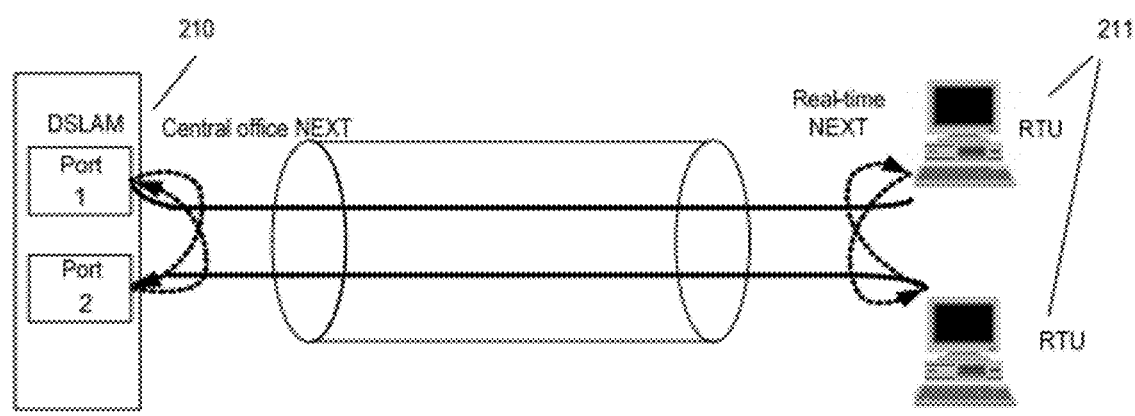
FIG. 2A and FIG. 2B show the crosstalk in the xDSL.
Figure 2B:
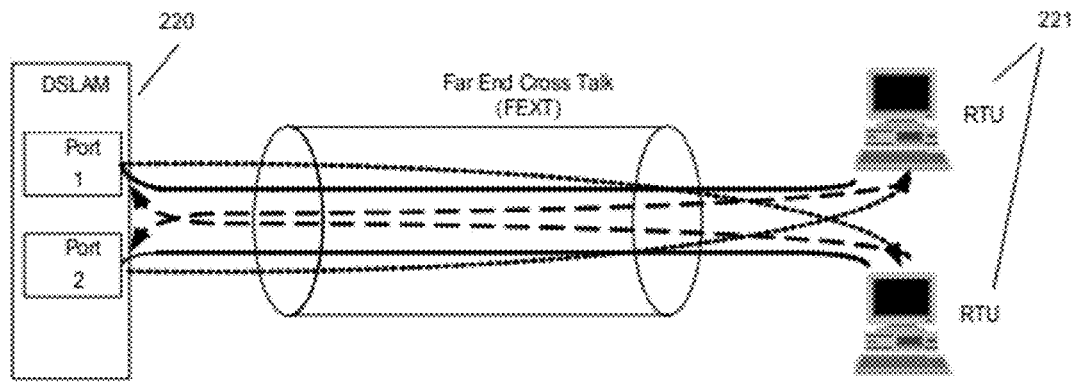
Figure 3:
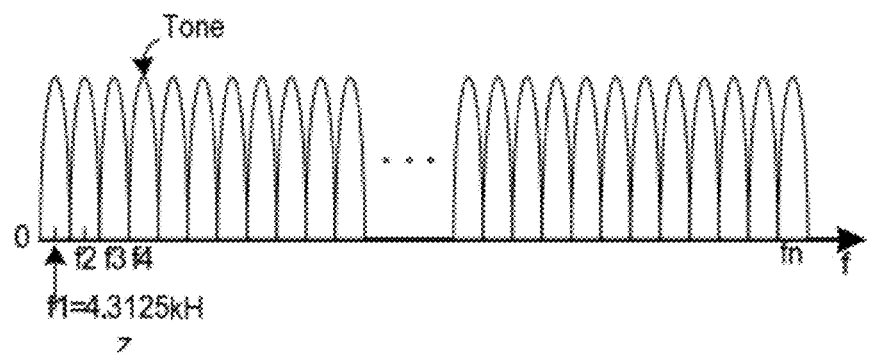
FIG. 3 shows the OFDM tones.
Figure 4:
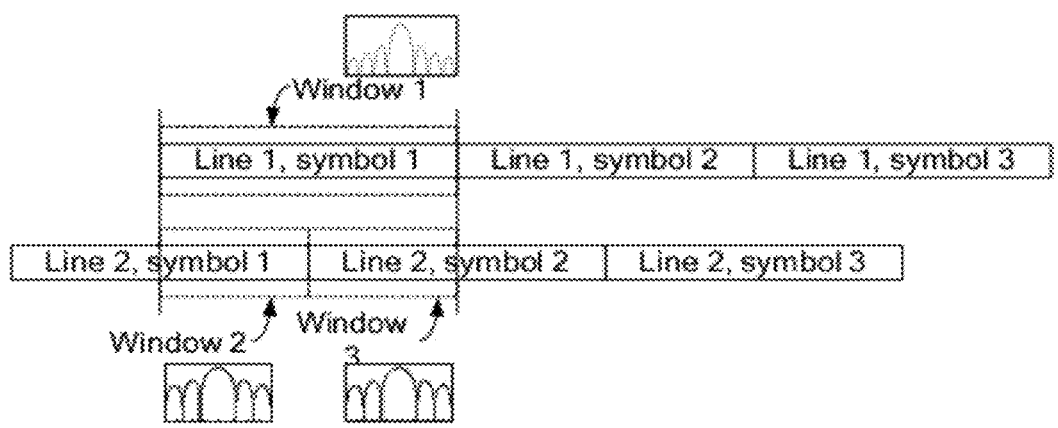
FIG. 4 shows a circumstance that the orthogonal feature of the tone is damaged due to asynchronous OFDM symbols.
Figure 5:
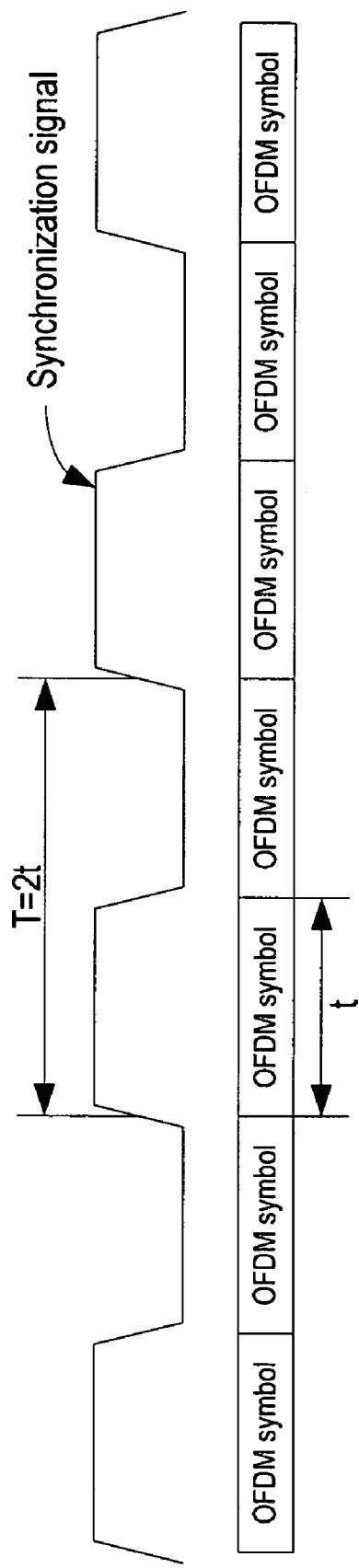
FIG. 5 shows the time sequence of synchronization signals in an embodiment of the present invention.
Figure 6:
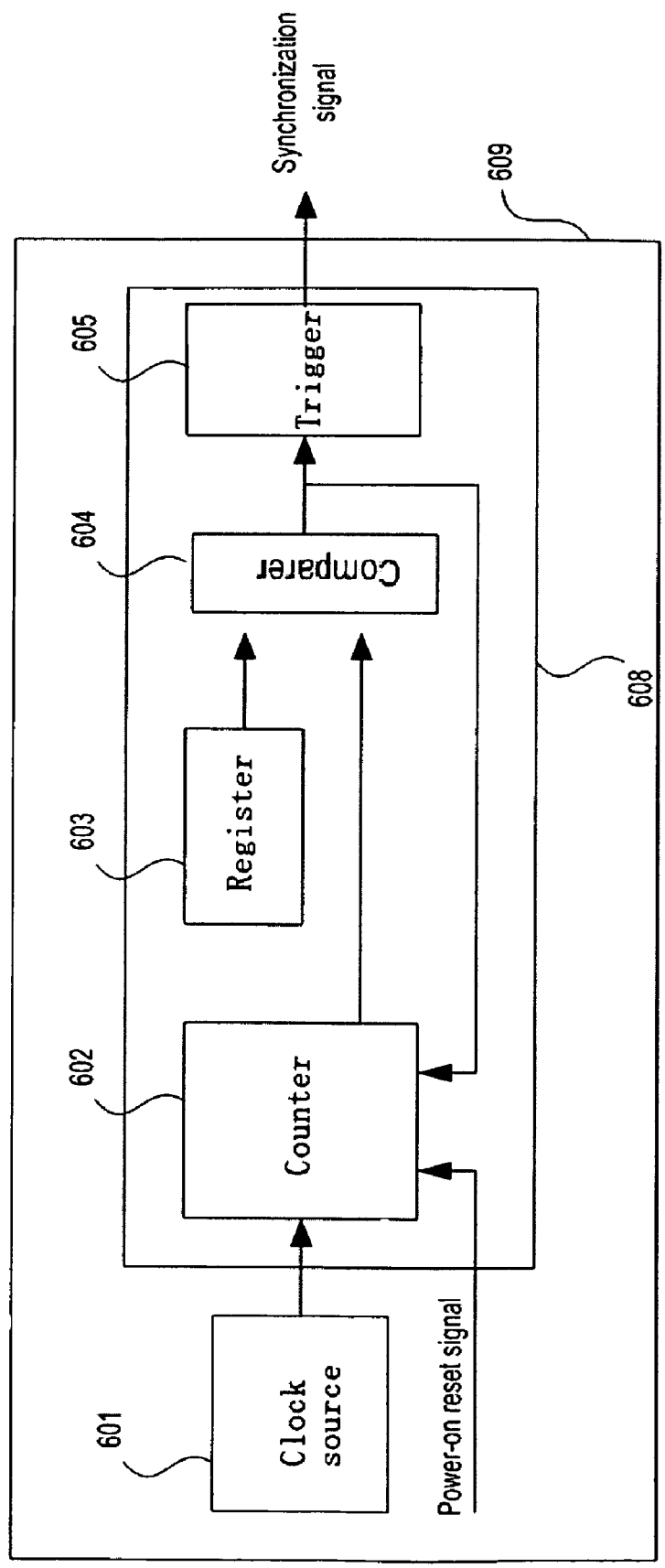
FIG. 6 is a circuit diagram of the synchronization signal generator in an embodiment of the present invention.

As shown in FIG. 5, this embodiment provides a square-wave signal whose period is double of the length of the OFDM symbol. Nevertheless, the period of the square-wave signal may be N-fold or 1/N-fold of the length of the OFDM symbol, where N is a natural number greater than 2. To put it briefly, we hereinafter suppose that the period of the square-wave signal is double of the length of the OFDM symbol. The square-wave signal may be generated by a stand-alone device located in the equipment room of the central office, or by a DSLAM of the central office. The circuit of generating a square-wave signal is shown in FIG. 6.

A synchronization signal generating circuit 609 includes two modules: a clock source or high-precision crystal oscillator 601; and a digital logic circuit 608. The clock source or high-precision crystal oscillator 601 generates a clock signal and sends it to a counter 602 for counting. The length of the OFDM symbol is stored in a register 603. In the case that the count of the counter 602 is equal to the length of the OFDM symbol stored in the register 603, a comparer 604 generates pulse. The pulse is divided into two pulses: one for generating synchronization signals for a T trigger 605; and the other for resetting the counter 602. The counter 602 contains a resetting interface, adapted to connect the power-on reset signal so that the digital logic circuit 608 can be reset after being powered on.

The clock source or high-precision crystal oscillator 601 (for example, constant-temperature crystal oscillator) requires a high precision.

The value in the register 603 depends on the clock frequency of the clock source or high-precision crystal oscillator 601 as well as the period of the OFDM symbol. For example, if the clock frequency of the clock source or high-precision crystal oscillator 601 is 35.328 MHz and the period of the OFDM symbol is 250 ms, the value in the register 603 will be: $35.328 \times 10^6 \times 250 \times 10^{-3} = 8832000$.

Figure 7:
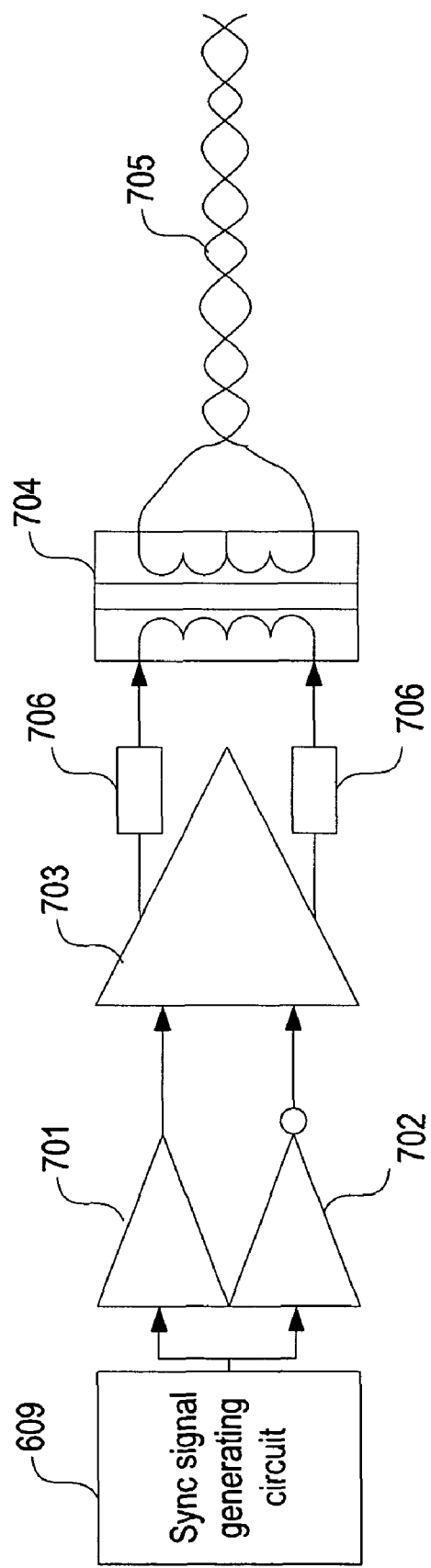
FIG. 7 is a circuit diagram of the synchronization signal transmitter interface in an embodiment of the present invention.

If the synchronization signal generating circuit is located in a stand-alone device in the equipment room of the central office, an analog circuit interface is required for transmitting the synchronization signal to the DSLAM. The interface circuit at the transmitter side is shown in FIG. 7.

The synchronization signal generated by the synchronization signal generating circuit 609 passes through a co-phase amplifier 701 and an inverse-phase amplifier 702, and is sent to the input side of a dual-end driver 703. The signal driven by the dual-end driver 703 passes through a matching resistor 706 and is sent to a coupler 704, and finally coupled to a twisted pair 705. Proper protection components should be connected to the output side of the coupler 704, depending on the environment of the twisted pair.

Figure 8:
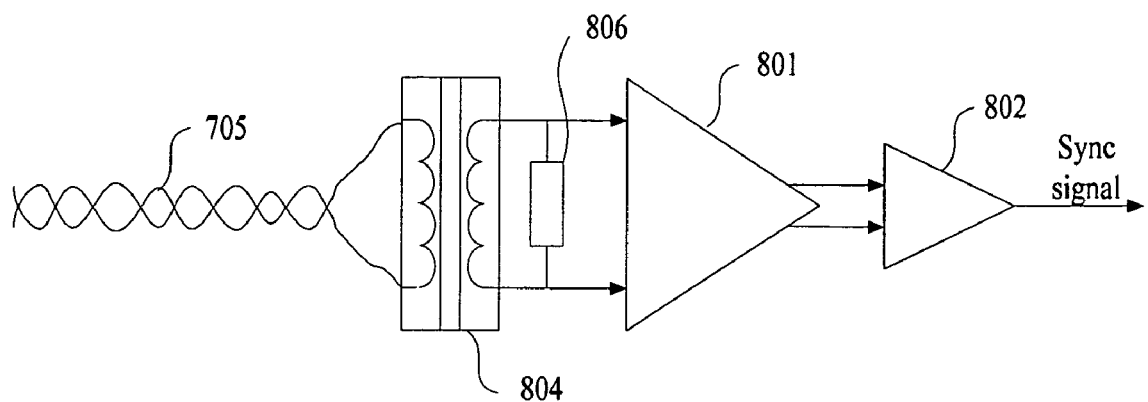
FIG. 8 is a circuit diagram of the synchronization signal receiver interface in an embodiment of the present invention.

The interface circuit of the receiver is shown in FIG. 8. The signal is transmitted by the twisted pair 705, and is sent to a dual-end amplifier 801 through a coupler 804. A matching resistor 806 should be connected at the receiver to prevent signal deterioration caused by signal reflection. The signal output by the dual-end amplifier 801 is synchronous after passing through a hysteresis comparer 802 with dual-end input. Likewise, proper protection components should be connected to the input side of the line, depending on the environment of the twisted pair.

Figure 9:
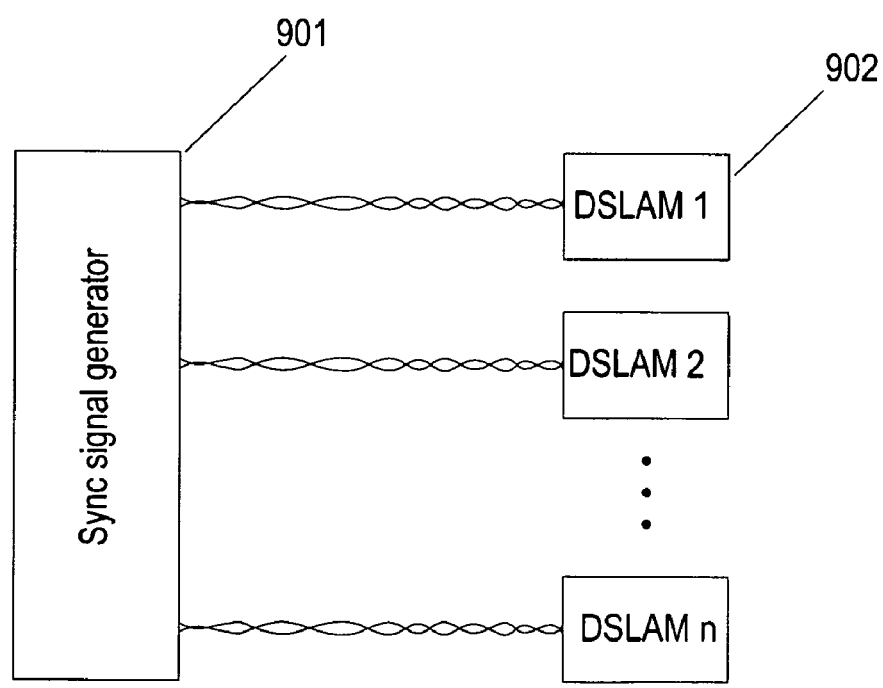
FIG. 9 shows the first mode of using the synchronization signal in an embodiment of the present invention.
Figure 10:
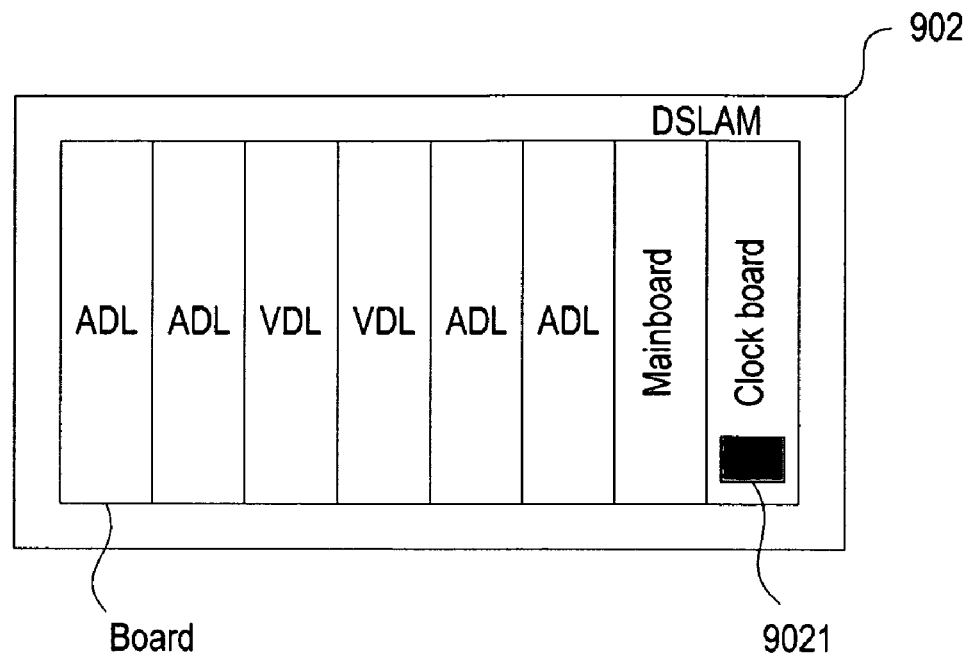
FIG. 10 shows the clock board corresponding to the first mode of using the synchronization signal in an embodiment of the present invention.

In the practical application, the synchronization signal generated above can be used in the following two ways:

(i) As shown in FIG. 9, a synchronization signal generator 901 generates multiple drive signals, and drives more than one DSLAM 902 directly through a twisted pair. The synchronization signal generator 901 consists of a function circuit shown in FIG. 7 and other servo circuits such as power supply. The DSLAM 902 may contain the function circuit (receiving circuit) shown in FIG. 8 and the corresponding servo circuit. As shown in FIG. 10, the receiving circuit may be a stand-alone board of the DSLAM 902 (hereinafter referred to as "clock board"). The clock board includes a synchronization signal physical interface 9021 for connecting the twisted pair which transmits synchronization signals; the receiving circuit may also be integrated onto a function circuit on the DSLAM mainboard.

Figure 11:
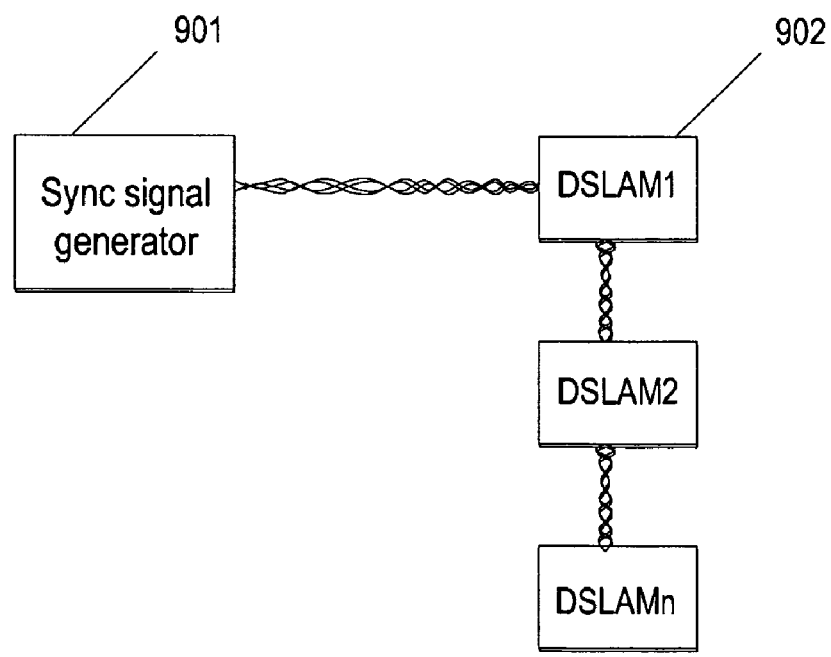
FIG. 11 shows the second mode of using the synchronization signal in an embodiment of the present invention.

(ii) The second mode of using the synchronization signals is shown in FIG. 11. The synchronization signal generator 901 outputs only one signal, but the DSLAM 902 is capable of concatenation. The synchronization signal generator 901 includes a function circuit shown in FIG. 7 and other servo circuits such as power supply. The DSLAM 902 contains not only the receiving circuit shown in FIG. 8, but also the transmitting circuit shown in FIG. 7 and other server circuits such as power supply.

Figure 12:
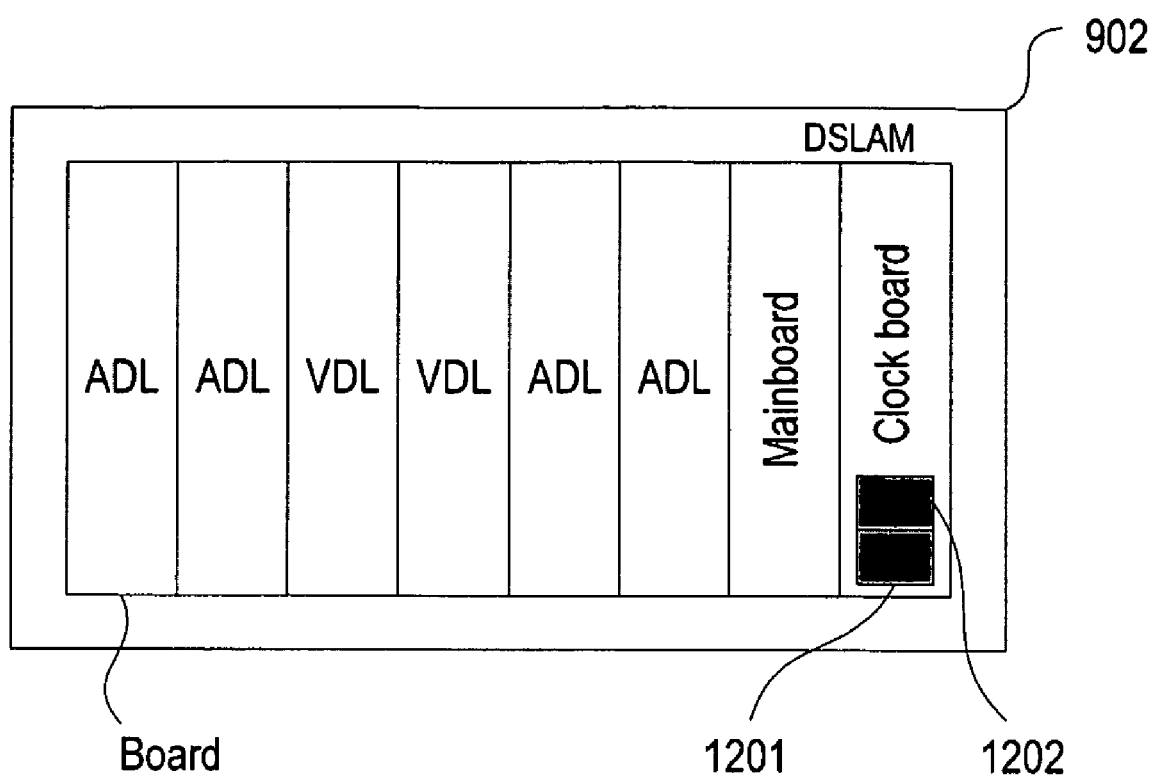
FIG. 12 shows the clock board corresponding to the second mode of using the synchronization signal in an embodiment of the present invention.

In the DSLAM 902, the previous circuits can be located on a stand-alone board, or integrated onto the mainboard. The location in a stand-alone board is shown in FIG. 12, in which the clock board contains two physical interfaces: one is a physical interface for inputting synchronization signals 1201 and the other is a physical interface for outputting synchronization signals 1202. The physical interface for outputting synchronization signals 1202 is adapted to connect the physical interface for inputting synchronization signals of another DSLAM.

The received synchronization signals may be distributed to different boards through the backplane wires, and further distributed to different chips on the board. The distribution through a backplane comes in two types: busbar mode and distribution mode.

If the signal received by the receiving circuit in the DSLAM is of low quality, especially when the previous busbar mode applies, the signal quality may be low due to impedance intermittence. This problem can be solved by a phase-locked loop circuit. The phase-locked loop circuit restores high-quality synchronization signals, and generates a synchronous working clock. In this way, the DSL line of the DSLAM can use the clock and further improve the orthogonal feature of the line.

After the DSLAM receives the synchronization signal, the synchronization information can be obtained by detecting the cross-zero point of the synchronization signal. The OFDM symbol can be synchronized only if the start time of the OFDM symbol corresponds to the cross-zero point of the synchronization signal. The word "correspond" here does not mean strict corresponding relationship between the start time of the OFDM symbol and the cross-zero point of the synchronization signal, and a certain delay is allowed only if the OFDM symbol can be synchronized. The synchronization information can be obtained by detecting other points of the synchronization signal rather than detecting the correspondence to the cross-zero point, so long as the OFDM symbol can be synchronized.

Figure 13:
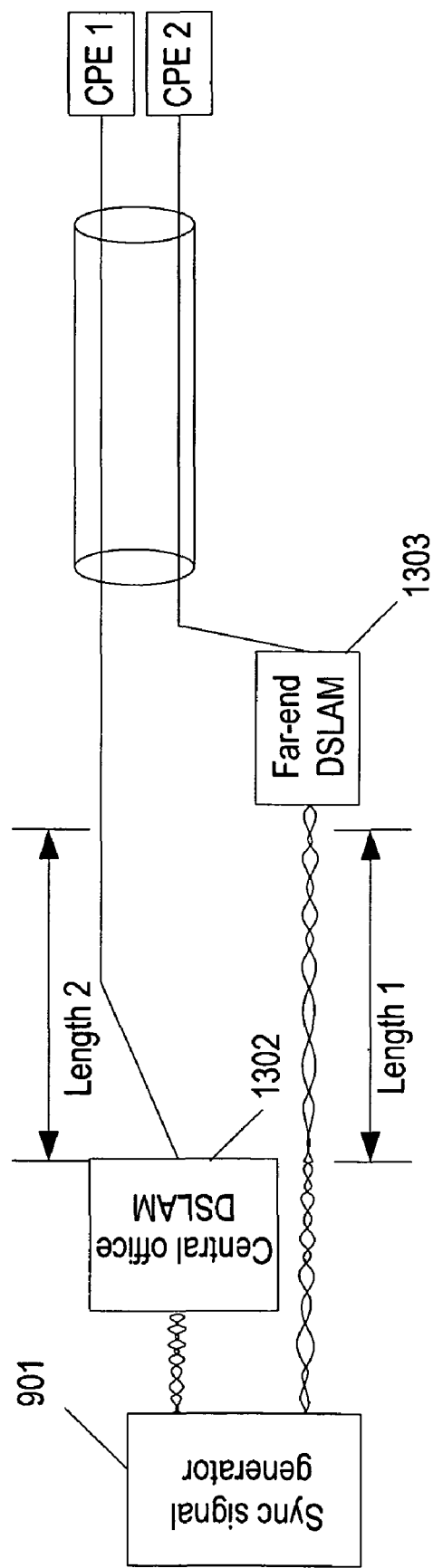
FIG. 13 shows transmission of synchronization signals when a remote DSLAM exists in an embodiment of the present invention.

If a far-end DSLAM exists, as shown in FIG. 13, the synchronization signal generator 901 generates synchronization signals. Due to transmission delay, although a central office DSLAM 1302 and a far-end DSLAM 1303 use the same synchronization signal, the synchronization signal received by the far-end DSLAM 1303 is later than the synchronization signal received by the central office DSLAM 1302 because the former is transmitted for an extra length 1. However, the OFDM symbol sent by the central office DSLAM 1302 may be exactly synchronous with the OFDM symbol sent by the far-end DSLAM 1303 when arriving at the location of the far-end DSLAM 1303 after a delay of length 2. That depends on the duration of length 1 and length 2, the transmission media of the two lengths, and the delay of the DSLAM in processing the synchronization signals. Therefore, an extra time sequence adjusting unit can be added into the synchronization signal generator 901 to adjust the synchronization signals of the far-end DSLAM 1303 and ensure that the OFDM symbol sent by the central office DSLAM 1302 is exactly synchronous with the OFDM symbol sent by the far-end DSLAM 1303 when arriving at the location of the far-end DSLAM 1303.

It should be noted that the "central office DSLAM," or "central office DSLAM and far-end DSLAM" mentioned in the previous embodiment is the OFDM transmission module.

The present invention may adopt not only the square-wave signal mentioned above, but also other signals such as sine wave signal, triangle wave signal and pulse signal which carry period information, so long as the period of such periodical signal is greater than or equal to the period of the OFDM symbol and is an integer multiple of the period of the OFDM symbol.

Taking a sine wave signal as an example, after a sine wave synchronization signal is generated, it is amplified, filtered and driven, and is transmitted to the DSLAM or other devices with the DSLAM functions through a transmission line. At the receiver, the sine wave signal is converted into a square-wave signal, whereupon the operations are the same as those of a square-wave signal described above. The conversion from a sine-wave synchronization signal to a square-wave signal is a well-known technology, and is not repeated here any further.

In the present invention, a synchronization signal generator generates a synchronization signal and sends it to the OFDM transmission module; the OFDM transmission module adjusts the OFDM symbols sent by all lines to synchronous symbols according to the synchronization signal and send the symbols out, thus implementing synchronization between OFDM symbols and optimizing the performance of the DSM.

The technical solution under the present invention is applicable not only to DSLAM, but also to other OFDM transmission equipment such as WiMax base stations and the equipment that transmits OFDM on a coax cable or power cable.

Ordinary technical personnel in this field may understand that all or part of the steps in the preceding embodiments can be completed through a program which instructs related hardware. The program may be stored in a readable storage medium, for example, ROM/RAM, disk, and CD in a computer.

It is understandable that although the invention has been described through some exemplary embodiments, the invention is not limited to such embodiments. Those skilled in the art can make no creative effort to derive all other embodiments from the embodiments herein through modification and equivalent substitutions, without departing from the protection scope of the present invention.

What is claimed is:

1. A method for synchronizing orthogonal frequency division multiplexing (OFDM) transmission symbols, comprising:

receiving, by a digital subscriber line access multiplexer (DSLAM) at a central office, a synchronization signal, wherein the synchronization signal is generated and sent by a synchronization signal generator at the central office, and the synchronization signal is transmitted from the synchronization signal generator to the DSLAM at the central office over a twisted pair inside the central office;

adjusting, by the DSLAM at the central office, OFDM symbols sent by all lines of the DSLAM at the central office to be synchronous symbols according to the synchronization signal;

receiving, by a far-end DSLAM, the synchronization signal generated by the synchronization signal generator; and synchronizing, by the far-end DSLAM, OFDM symbols sent by all lines of the far-end DSLAM according to the synchronization signal;

wherein a time sequence of the synchronization signal is adjusted in the synchronization signal generator before sending to the far-end DSLAM, so that the far-end DSLAM and the DSLAM at the central office receive the synchronization signal synchronously.

2. The method of claim 1, wherein a period of the synchronization signal is 2N-fold or ½N-fold of a length of one of the OFDM symbols, wherein N is a natural number.

3. The method of claim 1, wherein the receiving of the synchronization signal comprises:

processing, by the DSLAM, the synchronization signal through a phase-locked loop circuit after receiving the synchronization signal.

4. The method of claim 1, wherein the adjusting, by the DSLAM at the central office, the OFDM symbols sent by all line of the DSLAM at the central office lines to be the synchronous symbols according to the synchronization signal comprising:

synchronizing, by the DSLAM at the central office, the OFDM symbols sent by all lines of the DSLAM at the central office to make start time of the OFDM symbols of each line substantially match a cross-zero point of the synchronization signal.

5. The method of claim 1, wherein the synchronization signal generator is located at a stand-alone device at the central office, the stand-alone device comprises a first interface circuit for coupling the synchronization signal to the twisted pair, and the DSLAM at the central office comprises a second interface circuit for receiving the synchronization signal coupled to the twisted pair.

6. The method of claim 5, wherein the first interface circuit comprises a co-phase amplifier, an inverse-phase amplifier, a dual-end driver, a pair of matching resistors, and a first coupler;

wherein the synchronization signal generated by the synchronization signal generator passes through the co-phase amplifier and the inverse-phase amplifier, and is sent to an input side of the dual-end driver, the dual-end driver drives the synchronization signal to pass through the matching resistors and is sent to the first coupler, and the first coupler couples the synchronization signal to the twisted pair.

7. The method of claim 6, wherein the second interface circuit comprises a second coupler, a dual-end amplifier, and a hysteresis comparer;

wherein the synchronization signal transmitted over the twisted pair is obtained and sent to the dual-end amplifier by the second coupler, and the synchronization signal sent from the dual-end amplifier passes through the hysteresis comparer and outputs for synchronizing the OFDM symbols.

8. The method of claim 7, wherein the second interface circuit further comprises a matching resistor connected in parallel to the second coupler, and configured for preventing signal deterioration caused by signal reflection.

9. The method of claim 7, wherein the synchronization signal generator sends the synchronization signal to a plurality of DSLAMs respectfully through different twist pairs, each of the DSLAMs comprises a synchronization signal physical interface for receiving the synchronization signal transmitted over the corresponding twisted pair.

10. The method of claim 7, wherein the synchronization signal generator sends the synchronization signal to only one of a plurality of DSLAMs connected in series, each of the DSLAM comprises a first physical interface for receiving the synchronization signal, and a second physical interface for outputting the synchronization signal to another DSLAM.

11. A system for synchronizing orthogonal frequency division multiplexing (OFDM) transmission symbols, comprising a synchronization signal generator and a digital subscriber line access multiplexer (DSLAM) both at a central office:

the synchronization signal generator, configured to generate a synchronization signal and send the synchronization signal to the DSLAM though a twisted pair inside the central office;

the digital subscriber line access multiplexers (DSLAM), configured to receive the synchronization signal sent by the synchronization signal generator, and adjust OFDM symbols sent by all lines of the DSLAM to be synchronous symbols according to the synchronization signal;

wherein the synchronization signal generator comprises a synchronization signal generating circuit comprising a clock source and a digital logical circuit; wherein:
the digital logical circuit comprises a counter, a register, a comparer, and a T trigger;
the clock source is configured to generate clock signals;
the counter is configured to count according to the clock signals provided by the clock source;
the register is configured to store a length of one of the OFDM symbols; and
the comparer is adapted to generate a pulse when a count of the counter is equal to the length of the OFDM symbol stored in the register; wherein the pulse is divided into two pulses: one for generating the synchronization signals for the T trigger, the other for resetting the counter.

12. The system of claim 11, wherein a period of the synchronization signal generated by the synchronization signal generator is 2N-fold or ½N-fold of the length of the OFDM symbol, wherein N is a natural number.

13. The system of claim 11, wherein the length of the OFDM symbol stored in the register is a product of a clock frequency of the clock source and a period of the OFDM symbol.

14. The system of claim 11, wherein the DSLAM adjusts the OFDM symbols to be synchronous symbols by synchronizing OFDM symbols sent by all lines of the DSLAM at the central office to make start time of the OFDM symbols of each line substantially match a cross-zero point of the synchronization signal.

15. The system of claim 14, wherein the synchronization signal generator is located at a stand-alone device at the central office, the stand-alone device comprises a first interface circuit for coupling the synchronization signal to the twisted pair, and the DSLAM at the central office comprises a second interface circuit for receiving the synchronization signal coupled to the twisted pair.

16. The system of claim 15, wherein the first interface circuit comprises a co-phase amplifier, an inverse-phase amplifier, a dual-end driver, a pair of matching resistors, and a first coupler;
wherein the synchronization signal generated by the synchronization signal generator passes through the co-phase amplifier and the inverse-phase amplifier, and is sent to an input side of the dual-end driver, the dual-end driver drives the synchronization signal to pass through the matching resistors and is sent to the first coupler, and the first coupler couples the synchronization signal to the twisted pair.

17. The system of claim 16, wherein the second interface circuit comprises a second coupler, a dual-end amplifier, and a hysteresis comparer;
wherein the synchronization signal transmitted over the twisted pair is obtained and sent to the dual-end amplifier by the second coupler, and the synchronization signal sent from the dual-end amplifier passes through the hysteresis comparer and outputs for synchronizing the OFDM symbols;
wherein a matching resistor connected in parallel to the second coupler, and configured for preventing signal deterioration caused by signal reflection.

* * * * *